E. D. PRITCHARD.
Protection for Underground Telegraph Wires.

No. 144,135. Patented Oct. 28, 1873.

Witnesses:
A. H. Norrie
E. J. McLain

Inventor
E. D. Pritchard
By Van bantwoord & Hauff
attys

UNITED STATES PATENT OFFICE.

EDWARD D. PRITCHARD, OF NEW YORK, N. Y.

IMPROVEMENT IN PROTECTION FOR UNDERGROUND TELEGRAPH-WIRES.

Specification forming part of Letters Patent No. 144,135, dated October 28, 1873; application filed September 4, 1873.

*To all whom it may concern:*

Be it known that I, EDWARD D. PRITCHARD, of the city, county, and State of New York, have invented a new and useful Improvement in Arranging Telegraph - Wires; and I do hereby declare the following to be a full, clear, and exact description thereof, which will enable those skilled in the art to make and use the same, reference being had to the accompanying drawing forming part of this specification, in which drawing—

Figure 1:
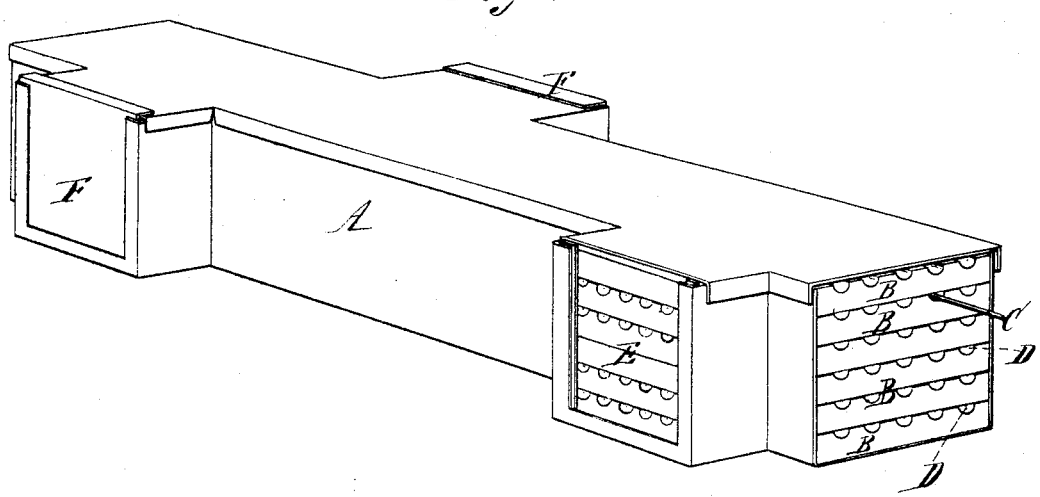
Figure 2:
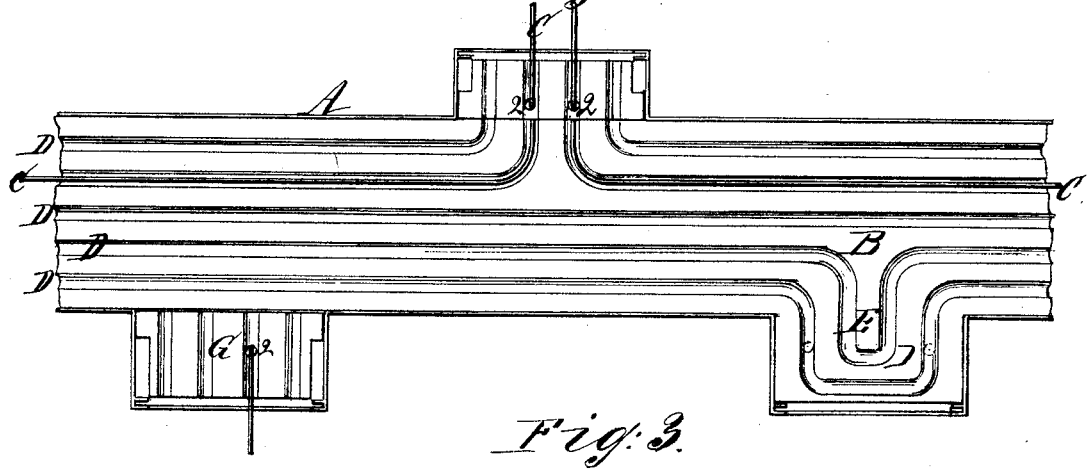
Figure 3:

Figure 1 is a perspective view of a portion of the apparatus or inclosing-case, by means of which I have in this example illustrated my invention, the case and the beds of the wires inclosed in it being seen in cross-section, and the end of one of the lateral chambers being uncovered. Fig. 2 is a top view of the apparatus as seen when the top of the case has been removed. Fig. 3 is a detached view of one of the movable slides of my apparatus.

Similar letters indicate corresponding parts.

This invention relates to a method of running telegraphic wires under or near the surface of the earth; and it consists in arranging such wires in or upon receptacles or beds having side chambers at different portions of their course, into and through which the wires are directed and led, and which are arranged in such a manner as to allow of access to the various wires without disturbing the main receptacle or receptacles, or that portion of the wire or wires which extends along in or upon them. The receptacles or beds are inclosed within a protecting-case, which is so made as to inclose also the side chambers, the ends of which are rendered accessible by means of doors made in the case for that purpose. In this example I have shown several receptacles or beds for the wires, arranged one upon another, so that the same apparatus can contain many wires, all protected by the same case; and each bed is grooved, so as to hold several different wires— one for each groove—though only alternate beds can be used in connection with the lateral chambers. Each wire is to be properly insulated, or such materials are to be used in constructing the beds or their grooves as will insure the necessary insulation; but that is not embraced by the present invention. Where only one wire is used the side arms or extensions can be arranged upon the side of the apparatus, and where only two wires are used such extensions can be on opposite sides for the respective wires, and access can be had to such wires at each extension which occurs on its own side; but where more than two independent wires are contained in the same bed, the wires which lie between the outer wires cannot conveniently be got at without disturbing the outer wires; and, therefore, in order to reach the inner wires, I provide a system of grooved slides, which I place alternately upon the lateral extensions of the main beds in such a manner that, when an inner wire is cut, one of its ends can be inserted up through the slide, every alternate one of which is grooved, and thus forms a combination of the bed, so as to intersect one of its grooves and be led along through it to the outside of the case, the grooves of the slide being arranged so as to lead the wire outward. By these means, and by providing a sufficient number of side extensions, I am enabled to bring out, at one side or the other, all the wires at pleasure, and at frequent intervals, without disturbing adjacent wires on the same bed, or the wires of higher or lower beds.

The letter A designates an inclosing-case, within which the several beds or receptacles B of the wires C are contained. The beds B are, in this example, provided with longitudinal grooves D, which receive and guide the several wires to their destinations, and are also provided with grooved chambers E, arranged at the sides at frequent intervals, in such a manner that the grooves of the chambers connect with the grooves D, so that the wires lie in the side chambers in the same relative order in which they lie in the main portions of the beds. The office of the chambers E is to make the wires C accessible for examination, or for connecting them with other lines, or for any other desired purpose, without disturbing any wire but the one sought after. In order to get at any particular wire through a chamber, E, the door F of that chamber is removed, and the slide G, which lies upon the particular chamber containing the wire sought, is pulled out, leaving the wires which traverse that chamber exposed to view. If the wire sought for is the left-hand or outside wire (observing Fig. 1) it is cut, and its end brought outside of the chamber through a hole, 1, which is made in the end of the chamber, so as to intersect the groove occupied by the wire. After the proper connections are made, the slides G and the door F are replaced. If the wire sought is an inside wire, the door and slides are removed as before, and the wire sought being thus exposed, it is cut and passed up through the hole 2, which is made through the bottom of the next slide above, so as to intersect an appropriate groove in that slide, and the end of the wire is brought through that groove to the outside, or until it is within reach. It is evident that when there are six wires extending through one of the beds B, three can be manipulated at one side and three at the opposite side of the apparatus, by means of the side chambers of that bed and of one slide having grooves leading outward, as described. The detached view of one of the slides, Fig. 3, shows the perforation 2, which intersects one of its grooves, through which one of the inner wires of the bed can be brought out to view after it has been severed in the chamber below. Where there are several beds, B, and several line-wires in each bed, as is represented in this example, maps or plans of the several beds, and of the order of their arrangement upon each other, and of the order or arrangement of the wires, are kept for reference, so that one can know by consulting the maps where to look for the wire sought for.

What I claim as new, and desire to secure by Letters Patent, is—

1. The chambers E, arranged upon opposite sides of the case A, and forming a continuation of the case or beds B, substantially as described, for the object specified.

2. The combination, with the bed or beds B and chamber or chambers E, of a movable grooved slide, substantially as described.

3. The case A, having the grooved chambers E arranged upon its opposite sides, in combination with the grooved beds B B' and doors F, substantially as and for the purpose described.

E. D. PRITCHARD.

Witnesses:
    CHAS. WAHLERS,
    E. F. KASTENHUBER.